United States Patent
Naka

(10) Patent No.: US 9,423,950 B2
(45) Date of Patent: Aug. 23, 2016

(54) DISPLAY CONTROL APPARATUS AND CONTROL METHOD

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 12/849,591

(22) Filed: Aug. 3, 2010

(65) Prior Publication Data

US 2011/0032201 A1    Feb. 10, 2011

(30) Foreign Application Priority Data

Aug. 7, 2009   (JP) ................... 2009-185165

(51) Int. Cl.
  *G06F 3/0488*   (2013.01)
  *G06F 3/041*    (2006.01)

(52) U.S. Cl.
  CPC ........... *G06F 3/0488* (2013.01); *G06F 3/0416* (2013.01)

(58) Field of Classification Search
  USPC ........................................................ 345/173
  See application file for complete search history.

(56) References Cited

U.S. PATENT DOCUMENTS

| | | | |
|---|---|---|---|
| 8,147,248 B2* | 4/2012 | Rimas-Ribikauskas et al. | 434/118 |
| 2005/0179672 A1* | 8/2005 | Chiu et al. | 345/173 |
| 2006/0284857 A1* | 12/2006 | Oh | 345/173 |
| 2010/0085316 A1* | 4/2010 | Kim | 345/173 |
| 2010/0090976 A1* | 4/2010 | Liao et al. | 345/174 |
| 2010/0269068 A1* | 10/2010 | Labrador | 715/823 |

FOREIGN PATENT DOCUMENTS

| | | |
|---|---|---|
| JP | 63-174125 A | 7/1988 |
| JP | 63-163532 U | 10/1988 |
| JP | 2000-010721 A | 1/2000 |
| JP | 2000-057094 A | 2/2000 |
| JP | 3181181 B2 | 7/2001 |
| JP | 2001-527678 A | 12/2001 |

* cited by examiner

*Primary Examiner* — Kent Chang
*Assistant Examiner* — Nathan Brittingham
(74) *Attorney, Agent, or Firm* — Canon USA, Inc. I.P. Division

(57) ABSTRACT

A display control apparatus, allowing a plurality of input operations to be performed by a touch panel, increasing application performance, and decreasing power consumption, is realized. The display control apparatus performs a coordinate sampling processing at a short (fast) coordinate sampling cycle t1 until a predetermined time T elapses from the starting of touch, and performs the sampling in a coordinate sampling cycle t2 that is longer (slower) than t1 after the predetermined time T elapses. The display control apparatus can certainly distinguish an operation in a coordinate sampling cycle of a necessary minimum speed by setting a coordinate sampling cycle to be high-speed at immediately after starting, and changing a coordinate sampling cycle to be low-speed in the other period.

16 Claims, 6 Drawing Sheets

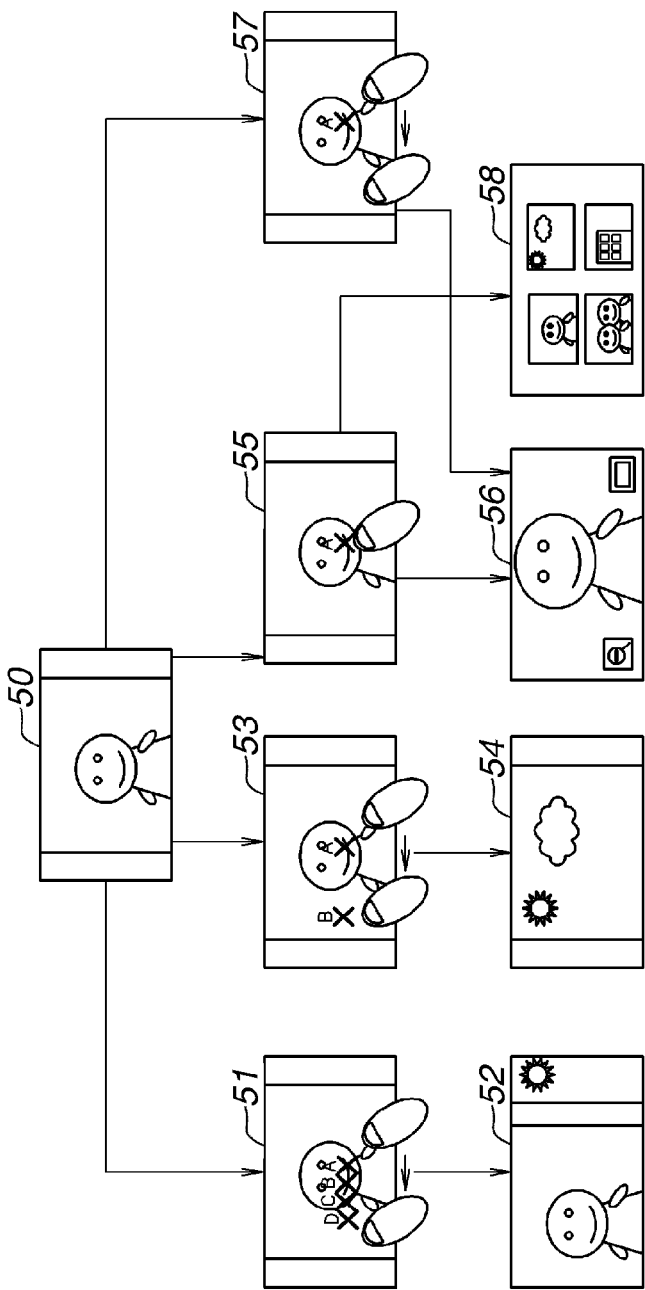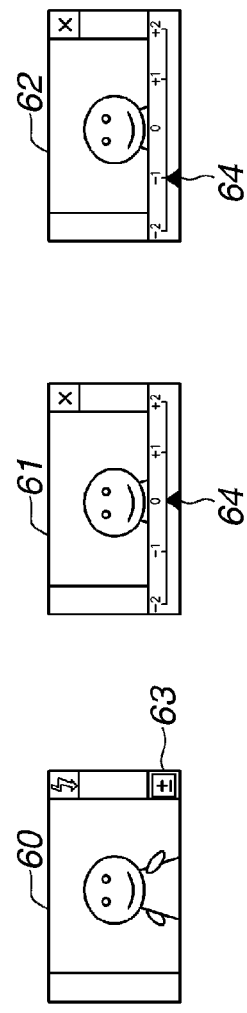

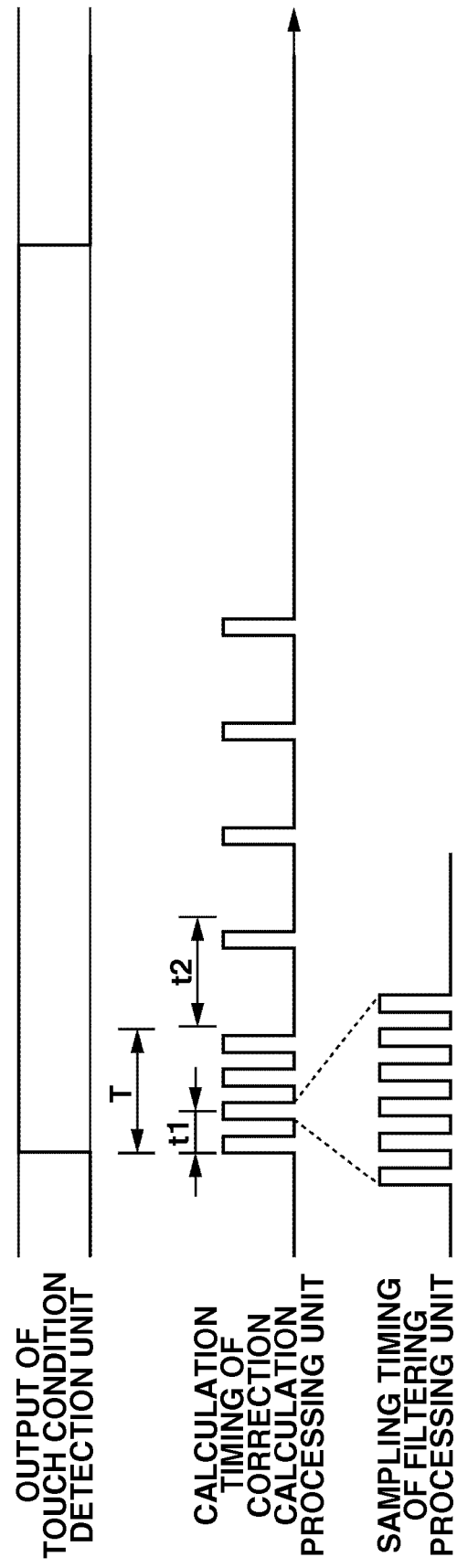

FIG.5
| FIG.5A | FIG.5B |
|---|---|
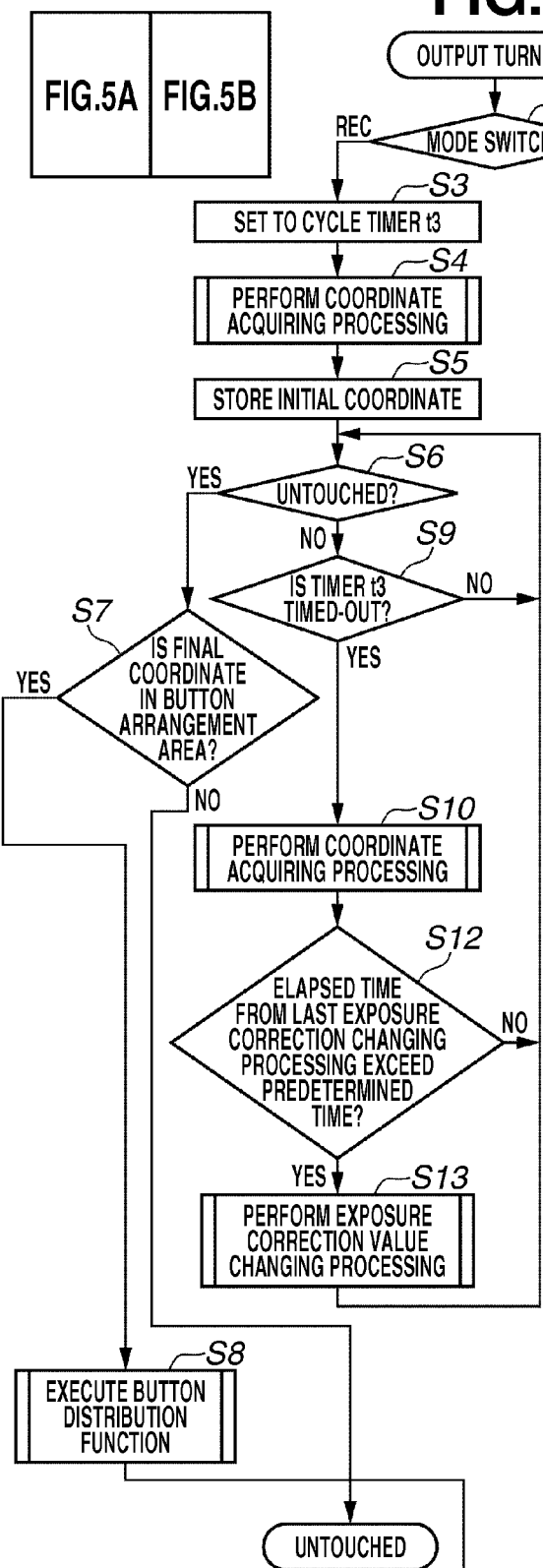
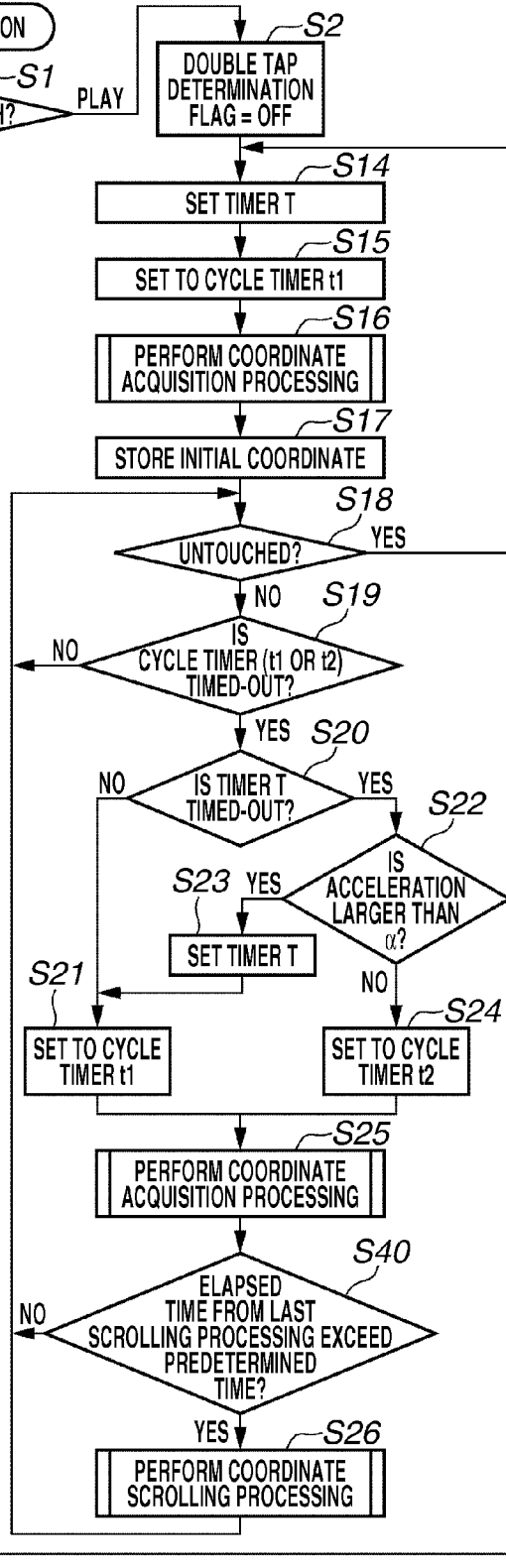
FIG.5A

DISPLAY CONTROL APPARATUS AND CONTROL METHOD

BACKGROUND OF THE INVENTION

1. Field of the Invention

The present invention relates to a display control apparatus that allows a plurality of input operations using a touch panel by a user, its control method, a program, and a computer-readable storage medium.

2. Description of the Related Art

Conventionally, various apparatuses and systems using an operation input means such as a touch panel have been developed and provided. With a development of applications that allows an intuitive input operation using a touch panel, user interface has been developed, and further advancement is expected from now on. Japanese Patent No. 3,181,181 discusses an operation determination method that allows a plurality of pen input operations without changing an input mode with respect to one application.

Further, a hand-written input is one of the characteristic input methods using a touch panel. When a control for an apparatus is performed based on such a trace of a touch position, a sampling method of the touch position may be important. Japanese Patent Application Laid-Open No. 2000-010721 discusses a technique for holding a balance between system load and the hand-written input operability by changing a sampling cycle to be an optimal value according to a changing speed of a touch position.

Further, there is provided a following function. That is, an operator quickly moves his finger in a certain distance while touching a touch panel, and then detaches his finger. A system control device of the touch panel detects this operation and moves the displayed item on the display panel, which is designated by the touch, with slowing down speed after the finger is detached (This operation is hereinafter referred to as flick). Japanese Patent Application Laid-Open No. 63-174125 discusses a technique in which a system control device scrolls an image displayed on a display unit by tracking a movement of a finger on a touch panel, gradually decreases the scrolling speed after the finger is detached from the touch panel, and stops the scrolling.

However, when a sampling cycle for detecting a touch position (coordinate) on a touch panel is slow, a system control device cannot distinguish a plurality of input operations, and thus an operability of the panel could be deteriorated. For example, there is a case that although a flick operation, in which an operator quickly moves his finger while touching, is performed, the system control device incorrectly determines that operation as a tap, in which a user touches on one point and quickly detaches without moving. Accordingly, for correctly distinguishing a plurality of input operations, a high-speed coordinate sampling is necessary.

However, when a system control device performs a high-speed sampling, load of a central processing unit (CPU) increases, so that an application performance may be decreased, such as a case that image display processing, e.g., animation processing, cannot be performed smoothly. Further, when the system control device always performs high-speed coordinate sampling processing, the number of analog digital conversion (AD conversion) processing is increased. Accordingly, power consumption is increased.

SUMMARY OF THE INVENTION

The present invention relates to a display control apparatus and its control method allowing a plurality of input operations using a touch panel by a user, and capable of increasing an application performance, and decreasing power consumption.

According to an aspect of the present invention, a display control apparatus includes a display unit, a touch condition detection unit, a touch position acquisition unit, and control unit. The display unit is configured to including a touch panel. The touch condition detection unit is configured to detect whether a condition is in a touch condition to the touch panel. The touch position acquisition unit is configured to acquire a touch position on the touch panel. The control unit is configured to control to acquire a touch position in a first cycle by the touch position acquisition unit until a predetermined time elapses from detection of a touch by the touch condition detection unit, and to acquire a touch position by the touch position acquisition unit in a second cycle which is longer than the first cycle, after the predetermined time elapses.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a screen change according to the exemplary embodiment.

FIG. 3 is a timing chart of coordinate sampling processing according to the exemplary embodiment.

DESCRIPTION OF THE EMBODIMENTS

Various exemplary embodiments, features, and aspects of the invention will be described in detail below with reference to the drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiments.

Figure 1:
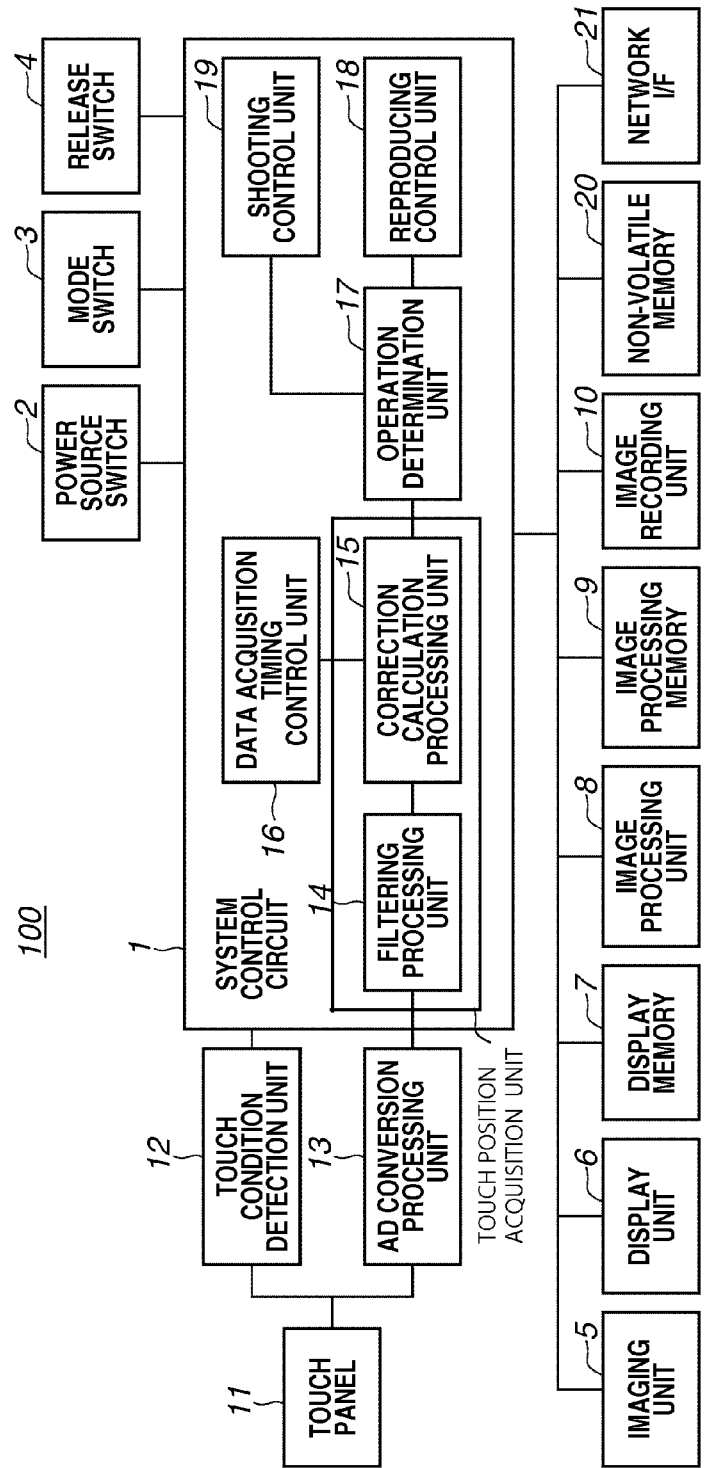
FIG. 1 is a block diagram illustrating an example configuration of a digital camera according to an exemplary embodiment.

FIG. 1 illustrates an example configuration of a digital camera 100 as one example of the display control apparatus to which the present invention is applicable.

A system control circuit 1 realizes processing described below by executing a program stored in a non-volatile memory 20 built-in or attachable/detachable to/from the digital camera 100. The system circuit 1 can execute a program located on a network via a network interface (I/F) 21, and thus the present invention can be applied to a program on a network.

A power source switch 2 instructs ON/OFF of power source of a digital camera 100. A mode switch 3 changes between a shooting mode for performing image processing of image data to store it in a image recording unit 10, and a reproduction mode for performing image processing of image data stored in the image recording unit 10 to display on a display unit 6. A release switch 4 instructs the digital camera 100 to record imaging data in the image recording unit 10.

An imaging unit 5 performs AD conversion of an image signal obtained by forming an image on an image sensor to output. A display unit 6 includes a liquid crystal display (LCD), and displays image data written in a display memory 7.

An image processing unit 8 performs compression/expansion processing and development processing on the image data captured by the imaging unit 5 and the image data recorded in the image recording unit 10. An image processing memory 9 is used as a work memory necessary for the image processing unit 8 to perform image processing. The image recording unit 10 records captured image data.

A touch panel 11 is arranged superposed on the display unit 6, and outputs touch input given by a user as an analog signal. The touch panel 11 is a resistance film type touch panel in the present embodiment, but any types can be used from among various types of a touch panels, such as an electrostatic capacity type and optical type other than the resistance film type.

A touch condition detection unit 12 detects a condition whether a user is touching the touch panel 11. The touch condition detection unit 12 outputs "ON" in a condition in which a user touches the touch panel 11 by the user's finger or a pen (hereinafter referred to as "touch"). Further, the touch condition detection unit 12 outputs "OFF" in a condition in which the user is not touching the touch panel 11 with the user's finger or the pen, that is, in a condition in which nothing is touching the touch panel 12 (hereinafter referred to as "untouch"). An AD conversion processing unit 13 converts an analog signal output from the touch panel 11 to a digital signal.

Of control blocks included in the system circuit 1, a filtering processing unit 14 performs filtering processing, such as median/average processing, on the converted digital signal by the AD conversion processing unit 13. A correction calculation processing unit 15 converts an output result from the filtering processing unit 14 to coordinates used by processing in the system control circuit 1, and corrects a deviation amount of panel output due to aging.

A touch position acquisition unit for acquiring a touch position on the touch panel 11 is configured with the filtering processing unit 14 and correction calculation processing unit 15. A data acquisition timing control unit 16 notifies coordinate acquisition timing to the correction calculation processing unit 15 based on a coordinate sampling cycle (a coordinate acquisition cycle), such as t1 to t3 described below.

The correction calculation processing unit 15 instructs the filtering processing unit 14 to acquire coordinate data according to a data acquisition timing notified from the data acquisition timing control unit 16. The filtering processing unit 14 causes the AD conversion processing unit 13 to start an operation, in response to the coordinate acquisition request from the correction calculation processing unit 15, and to perform necessary number of AD conversions for filtering processing, and then to stop the operation thereof.

An operation distinction unit 17 distinguishes kinds of input operations by a user, based on the coordinate data in which correction processing is performed by the correction calculation processing unit 15. A reproducing control unit 18 performs system control in the reproducing mode according to the output of the operation distinction unit 17. A shooting control unit 19 performs system control in the shooting mode according to the output of the operation distinction unit 17.

The shooting mode of the digital camera 100 includes a plurality of modes, such as an automatic shooting mode, a manual shooting mode, and a scene shooting mode that is specialized to a specified scene. Further, many functions are provided for correcting shooting according to modes and user setups.

For example, there is a through-display function, which displays an image currently being captured by the imaging unit 5 on the display unit 6 on real time. Further, there is a face detection function, which detects a human face from an image currently being captured by the imaging unit 5. Furthermore, there is a tracking function for tracking a specified object in an image currently being captured by the imaging unit 5 by acquiring a relationship between images.

Furthermore, a shooting setting function, which performs shooting setting, such as auto focus (AF), auto exposure (AE), and auto white balance (AWB), according to a specified object in an image currently being captured by the imaging unit 5. These functions respectively cause system load to be increased.

Then, details of image reproduction processing in the digital camera 100 will be described. FIG. 2A illustrates screen transitions of the display unit 6 that includes the touch panel 11 by a reproduction application of the digital camera 110.

As illustrated in a state 51, when a user touches a screen and slowly moves the user's finger over the display screen, coordinates of four points of A, B, C, and D are sampled (coordinate acquisition) in this order. A reproduction application scrolls the image as illustrated in a state 52 according to the input coordinates in sequence (hereinafter referred to as "a drag operation").

Further, as illustrated in a state 53, a user touches the screen, moves the user's finger over the screen, and then untouches. When the final speed at the untouch point of time is equal to or larger than a predetermined speed, the coordinates A and B are sampled (coordinate acquisition) in this order, and the reproduction application calculates an operation speed between A and B.

When the operation speed is equal to or larger than the predetermined speed, the reproduction application scrolls the images from a current image to a next image with slowing down the speed after untouch, and stops the scrolling when the next image is displayed at a predetermined position as illustrated in a state 54 (hereinafter referred to as a flick operation).

Further, as illustrated in a state 55, when a user touches the screen and untouches at a position within a predetermined range from the first coordinate position, as illustrated in a state 56, the reproduction application enlarges a currently reproducing image centering the coordinate position touched, and displays on the screen (hereinafter referred to as "a tap operation").

Furthermore, when a user repeats touch and untouch operations two times, the reproduction application displays a plurality of images on the screen as illustrated in a state 58 (herein after referred to as a double tap operation).

In such a reproduction application, when a user wants to see an image that is a several sheet beyond, the user can feed images one by one by continuously performing a flick operation as illustrated in the state 53. At this time, when a coordinate sampling cycle in the touch panel 11 is slow, as illustrated in a state 57, the user's operation may be incorrectly determined as a tap operation although the user performs the flick operation.

For preventing such a misdetection, as a coordinate sampling cycle in an apparatus, it is necessary to use a most high-speed coordinate sampling cycle in coordinate sampling cycles necessary to detect each input operation.

However, in the drag operation as illustrated in the state 51, when a high-speed coordinate sampling operation (coordinate acquisition processing) is performed, CPU load increases and accordingly the scrolling operation cannot be smoothly performed. Moreover, when the high-speed coordinate sampling processing is always performed, the number of AD conversion processing is increased, resulting in power consumption increase.

Therefore, the system control circuit 1 performs coordinate sampling processing in a coordinate sampling cycle t1 (a first cycle), which is short (fast), until a predetermined time (T) elapses from starting of touch. Then, after the predetermined time (T) elapses, the system control circuit 1 performs the sampling processing in a coordinate sampling cycle t2 (a second cycle), which is longer (slower) than t1. Further, even after the predetermined time (T) elapses, when a moving speed of touching finger becomes high, the system control circuit 1 changes the coordinate sampling cycle to be the short coordinate sampling cycle t1 again.

Accordingly, the system control circuit 1 changes a coordinate sampling cycle to be high-speed at a time of immediately after starting of touch in which there is a possibility of performing the flick operation, or when the drag operation becomes quick. In a period other than these cases, the system control circuit 1 changes the coordinate sampling cycle to be low-speed. Therefore, the system control circuit 1 can reliably distinguish an operation with a coordinate sampling cycle of a requisite minimum speed.

Then, the above-described processing will be described in detail. FIG. 3 is a timing chart of coordinate sampling processing. When output of the touch condition detection unit 12 turns ON, the filtering processing unit 14 acquires touched coordinate data, which is AD converted in the AD conversion processing unit 13, on the touch panel 11 in a predetermined cycle (filtering processing unit sampling timing).

The predetermined cycle, in which the filtering processing unit 14 acquires the coordinate data, is sufficiently faster than a coordinate sampling cycle (t1, t2, or t3) in which the correction calculation processing unit 15 acquires one coordinate data.

When the coordinate data acquired by the filtering processing unit 14 reaches a predetermined number (for example, 6), the correction calculation processing unit 15 arranges the acquired 6 coordinate data in order of a size, and performs averaging processing to four data positioned at a center of the arranged coordinate data, so that one coordinate data is acquired.

A cycle for acquiring one coordinate data by the correction calculation processing unit 15 is t1 until the predetermined time T elapses from turning ON of the output of the touch condition detection unit 12, and is t2, which is longer than t1, after the predetermined time (T) elapses (correction calculation processing unit calculation timing).

Hereinafter, t1 and t2 are referred to as a coordinate sampling cycle. That is, the system control circuit 1 performs high-speed coordinate sampling in the coordinate sampling cycle t1 in a period of the time T after touch starting. After the time T elapses, the system control circuit 1 performs low-speed coordinate sampling in the coordinate sampling cycle t2.

Figure 4:
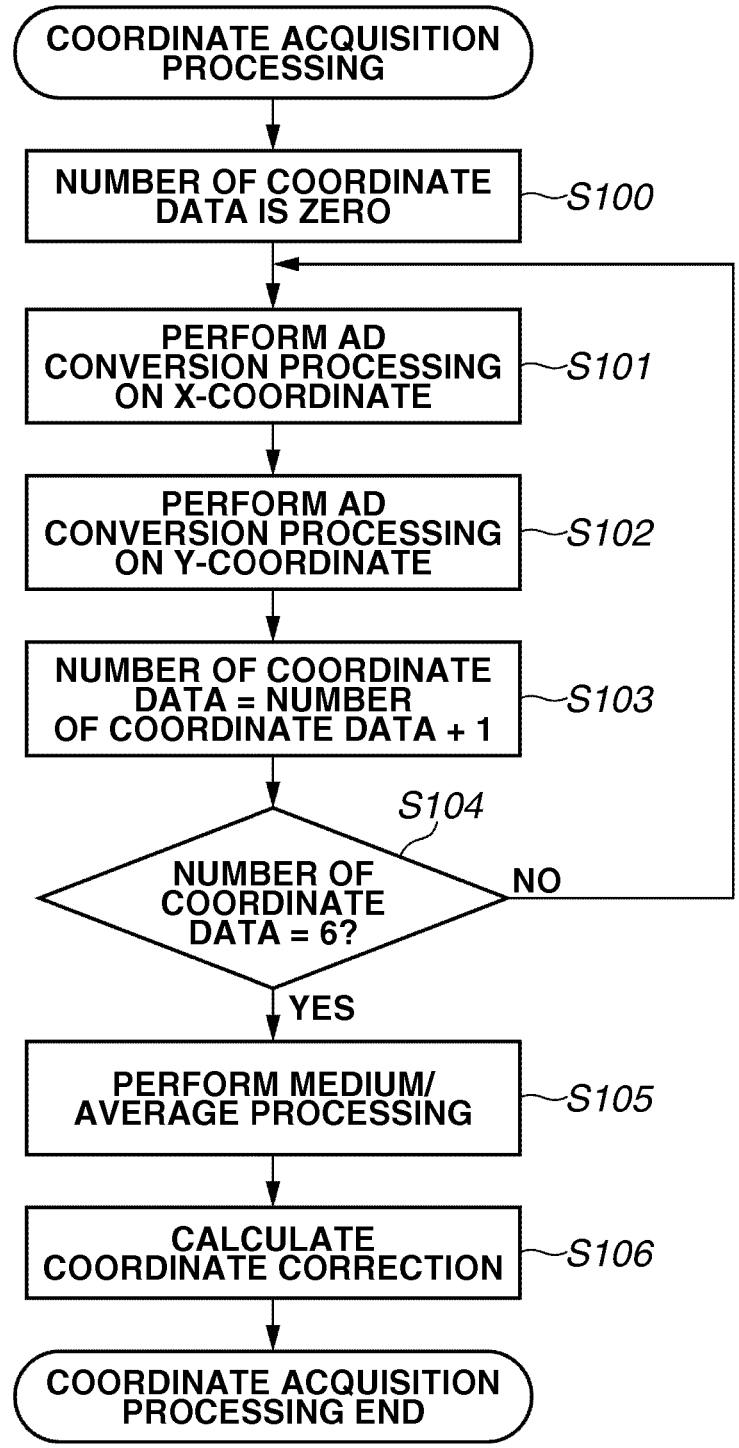
FIG. 4 is a flowchart illustrating coordinate sample processing according to the exemplary embodiment.

FIG. 4 is a flowchart illustrating coordinate sampling processing in the correction calculation processing unit 15 of the system control circuit 1.

In step S100, system control circuit 1 initializes the number of AD converted coordinate data with 0. In step S104, the system control circuit 1 repeats AD conversion processing of the coordinate until the number of data coordinate reaches a predetermined number (for example, 6)(NO in step S104) and, in steps S101 to S104, acquires the predetermined number of the coordinate data via the filtering processing unit 14. Here, a cycle repeating the AD conversion is a far shorter than the coordinate sampling cycle t1.

Then (YES in step S104), the processing proceeds to step S105. In step S105, the system control circuit 1 arranges acquired 6 coordinate data in order of a size, and performs averaging processing of the 4 data positioned at a center of the arranged coordinate data. In step S106, the system control circuit 1 performs, with respect to one pair of coordinate data acquired in step S105, coordinate conversion processing, and multiplies the result by a correction coefficient. Thus, the system control circuit 1 acquires one coordinate data and completes the coordinate sampling processing.

In the present exemplary embodiment, the coordinate sampling processing is described including all of the AD conversion result acquisition and its filtering processing, and correction calculation processing. However, it is not necessary to include all of them. The effect of the present invention can be sufficiently acquired by including only any one of the filtering processing and correction calculation processing.

Further, it is just an example that the predetermined number of coordinate data acquired by the filtering processing unit 14 is determined to be "6" for acquiring one coordinate data by the correction calculation processing 15. Furthermore, in the present exemplary embodiment, the coordinate sampling cycle is the same number "6" in each coordinate sampling cycle t1 to t3. However, the number can be another fixed number or a variable number according to a coordinate sampling cycle.

Figure 5B:
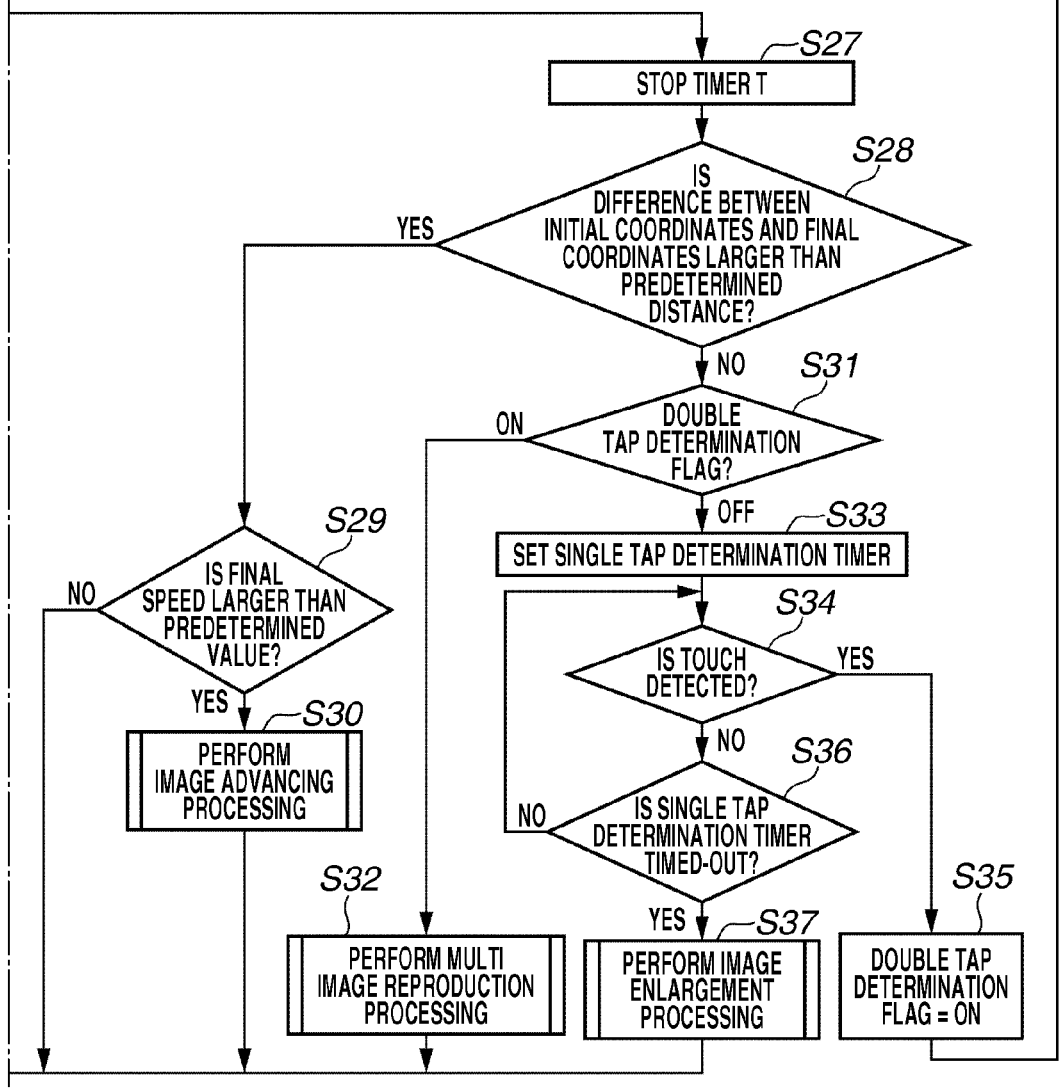
FIG. 5 is a flowchart illustrating processing corresponding to an input operation to a touch panel according to the exemplary embodiment.

FIG. 5 is a flowchart illustrating a processing corresponding to an input operation to the touch panel 11 by the system control circuit 1. Relationships between t1, t2, and t3 in the flowchart are assumed that t1<t2, t1<t3, and t1<T.

The system control circuit 1 starts following processing when the system control circuit 1 detects that output of the touch condition detection unit 12 turns ON. In step S1, when the mode switch 3 is set to the shooting mode (REC in step S1), the processing proceeds to step S3. In step S3, the system control circuit 1 sets t3 to the coordinate sampling cycle timer. In step S4, the system control circuit 1 performs the coordinate sampling processing (refer to FIG. 4).

In step S5, the system control circuit 1 stores the acquired coordinates as initial coordinates, and waits for when the output of the touch condition detection unit 12 turns OFF (untouch) (YES in step S6), or when the coordinate sampling cycle timer t3 is timed-out (YES in step S9).

When the output of the touch condition detection unit 12 turns OFF in step S6 before the coordinate sampling cycle timer t3 is timed-out (YES in step S6), in step S7, the system control circuit 1 determines whether the final acquired coordinates are in a button area on a screen (graphical user interface (GUI)).

When the coordinates are in the button area (YES in step S7), then in step S8, the system control circuit 1 performs a processing corresponding to the button (a control processing corresponding to a tap operation). For example, a user untouches in an area of an exposure correction value changing button 63 on a screen 60 in FIG. 2B, the system control circuit 1 shifts the screen 60 to a screen 61 for setting a exposure correction value applying to the shooting image.

Further, when the coordinate sampling cycle time t3 is timed-out in step S9 (YES in step S9), in step S10, the system control circuit 1 performs the coordinate sampling processing (refer to FIG. 4). When a predetermined time elapses after performing a processing corresponding to the touch last time (YES in step S12), the processing proceeds to step S13. In step S13, the system control circuit 1 performs a processing corresponding to the touch (control processing corresponding to the drag operation).

Here, changing processing of an exposure correction value is described according to screen examples in FIG. 2B. As illustrated in the screen 61 to the screen 62 in FIG. 2B, a cursor indicating a correction amount moves according to a touch position. By changing the exposure correction amount according to such a continuous touch operation, the system control circuit 1 can provide, to a user, an operation means easily changing an exposure correction amount without repeating touch and untouch.

At this time, if change of a correction amount becomes too sensitive to a touch operation, especially in an operation with a finger, fine adjustment becomes difficult. In such a screen, the coordinate sampling in a high-speed cycle is not required.

In addition, when the mode switch 3 is set to a shooting mode (REC in step S1), the system control circuit 1 may execute a through display processing which displays an image captured by the imaging unit 5, on the display unit 6 on real time. Further, the system control circuit 1 may execute a face detection processing for detecting a human face from an image captured by the imaging unit 5.

Further, the system control circuit 1 may execute a tracking processing for tracking a specified object in an image captured by the imaging unit 5 by acquiring a relative relationships between images. Further, the system control circuit 1 may execute a shooting setting processing, which performs shooting setting focusing on a specified object in an image captured by the imaging unit 5 according to a shooting preparation instruction.

The system control circuit 1 can set the shooting setting to be a setting in which the shooting setting can be set in all times even when the shooting preparation instruction is not performed. The system control circuit 1 executes shooting when the shooting is instructed by an operation of the release switch 4 or the touch panel 11, and records the captured image file in the image recording unit 10.

Therefore, in the shooting mode, processing load of the system control circuit 1 is very high, so that if the system control circuit 1 performs coordinate sampling processing at high-speed, there is a possibility that other processing may receive bad effects. Further, as described above, a high-speed coordinate sampling cycle is not also necessary.

Therefore, in the shooting mode, the system control circuit 1 uses the coordinate sampling cycle t3, which is slower than the coordinate sampling cycle t1 that is used in the reproduction mode. Thus, the processing load is restrained.

On the other hand, in step S1, when the mode switch 3 is set to the reproduction mode (PLAY in step S1), the processing proceeds to step S2. In step S2, the system control circuit 1 turns OFF the double tap determination flag. In steps S14 and S15, the system control circuit 1 sets the timer T and the coordinate sampling cycle timer t1. In step S16, the system control circuit 1 performs coordinate sampling processing (refer to FIG. 4).

In step S17, the system control circuit 1 stores the acquired coordinates as initial coordinates, and waits for when output of the touch condition detection unit 12 becomes OFF (untouch) (YES in step S18) or when the coordinate sampling cycle timer t1 or t2, which is currently set, is timed-out (YES in step S19).

When output of the touch condition detection unit 12 turns OFF in step S18 before the coordinate sampling cycle timer t1 or t2 is timed-out (YES in step S18), then in step S27, the system control circuit 1 stops the timer T.

In step S28, the system control circuit 1 performs a distance determination for determining whether a distance between the initial coordinates stored in step S17 and a final coordinates is longer than a predetermined distance. When the distance between the initial coordinates and the final coordinates is longer than the predetermined distance in step S28, (YES in step S28), then in step S29, the system control circuit 1 acquires the final speed of a coordinate change (a speed of a touch position change before untouch) for determining the speed.

When the final speed is higher than a predetermined speed in step S29 (YES in step S29), in step S30, the system control circuit 1 determines that the operation is a flick operation, enlarges a next image by the image processing unit 8, generates a display data in the display memory 7, and performs image advancing processing (display processing corresponding to the flick operation), which displays images with scrolling.

This operation corresponds to a change from the state 53 to the state 54 in FIG. 2A. When a user continuously feeds images, a touching time to the touch panel 11 becomes short, so that the system control circuit 1 cannot acquire sufficient coordinate data for acquiring the final speed if the system control circuit 1 does not perform coordinate sampling in a high-speed cycle.

Particularly, in a resistance film type touch panel, since a time period to which sufficient pressure is applied becomes short, and therefore, problems become remarkable, a high-speed coordinate acquisition in a cycle of several 100 µs to several ms is necessary.

When the distance between the initial coordinates and the final coordinates is shorter than the predetermined distance in step S28 (NO in step S28), then in step S31, the system control circuit 1 determines whether the operation is the tap operation or the double tap operation. More specifically, the system control circuit 1 determines ON/OFF of the double tap determination flag.

When the double tap determination flag is ON in step S31 (ON in step S31), then in step S32, the system control circuit 1 performs multi-image reproduction processing (display processing corresponding to a double tap operation). This operation corresponds to the transition from the state 55 to the state 58 in FIG. 2A.

Further, when the double tap determination flag is OFF in step S31 (OFF in step S31), then in step S33, the system control circuit 1 set a single tap determination timer. The system control circuit 1 waits for the time when, in step S34, the output of the touch condition detection unit 12 turns ON or when, in step S36, the single tap is certified.

When the output of the touch condition detection unit 12 turns ON in step S34 (YES in step S34), then in step S35, the system control circuit 1 sets the double tap determination flag to be ON.

Further, when the single tap is determined in step S36, (YES in step S36), then in step S37, the system control circuit 1 performs image enlargement processing (display processing corresponding to the tap operation) for enlarging an image centering the acquired coordinates and displaying by the image processing unit 8. This operation corresponds to the transition from the state 55 to the sate 56 in FIG. 2A.

Further, when the coordinate sampling cycle time is timed-out in step S19 (YES in step S19), then in step S20, the system control circuit 1 determines whether the timer T is timed-out.

When the timer T is not timed-out in step S20 (NO in step S20), in step S21, the system control circuit 1 sets the coordinate sampling timer t1 and, then in step S25, performs the coordinate sampling processing (refer to FIG. 4).

When an elapsed time from a last scrolling processing exceeds a predetermined time (YES in step S40), in step S26, the system control circuit 1 performs image scroll processing. In this operation, as illustrated from the state 51 to the state 52 in FIG. 2A, the system control circuit 1 scrolls the image according to a movement of coordinates in which a user touches.

At this time, the system control circuit 1 needs to generate display data in which a display area of the image is shifted a little one by one by the image processing unit 8, and to display them in sequence, so that the processing load of the system becomes high.

At that time, if there are many processing operating in a background of the system, the system control circuit 1 cannot smoothly perform display updating. On the other hand, with respect to such an operation, the system control circuit 1 can sufficiently follow to the user's operation by the coordinate sampling of several 10 ms interval.

When the timer T is timed-out in step S20 (YES in step S20), then in step S22, the system control circuit 1 calculate an acceleration of coordinate change based on the past sampling coordinates. When the acceleration exceeds a predetermined acceleration a (YES in step S22), then in step S23, the system control circuit 1 set the timer T for performing high-speed sampling, and the processing proceeds to step S21.

On the other hand, when the acceleration is equal to or smaller than the predetermined acceleration a (NO in step S22), then in step S24, the system control circuit 1 set the coordinate sampling cycle timer t2 and, then in step S25, performs the coordinate sampling processing (refer to FIG. 4).

Accordingly, when a user accelerates an operation, the system control circuit 1 operates by changing to a high-speed coordinate sampling cycle for performing an accurate input decision. By this operation, even when the system control circuit 1 operates in a slow-speed coordinate sampling cycle, the system control circutil can handle an exchange from a slow-speed operation to a high-speed operation by a user.

As described above, in a mode necessary to perform a high-speed input operation, such as, the transition from the state 53 to the state 54 or from the state 55 to the state 58 in FIG. 2A, the system control circuit 1 changes a time of a coordinate sampling cycle timer according to an elapsed time from touching and an acceleration while being continuously touched. By this operation, the system control circuit 1 can decrease system load without deteriorating operability. On the other hand, in a mode in which a high-speed input operation is not necessary, the system control circuit 1 always performs coordinate sampling with a slow-speed cycle, and thus it becomes possible to decrease system load.

Further, in the flowchart in FIG. 5, the exposure correction screen in the shooting mode is used as an example. However, the system control circuit 1 can dynamically and properly use the coordinate sampling cycle changing processing according to an executing state of various provided functions in the shooting mode, and thus further system load can be decreased.

Further, the system control circuit 1 can dynamically and properly use the coordinate sampling cycle changing processing according to the kind of input operation that is acceptable at that time, and thusfurther system load can be decreased. For example, in a mode in which a flick operation is not accepted based on a final speed and a double tap operation is not accepted by a reason on specification, when the system control circuit 1 uses a coordinate sampling cycle of slow-speed and constant-speed, the system load can be decreased.

In addition, one hardware can perform the control performed by the control circuit 1, or a plurality of hardware can share processing and control an entire apparatus. Further, in the above-described exemplary embodiment, the present invention is applied to a digital camera as an example. However, the application is not limited thereto. The present invention can be applied to apparatuses using a touch panel, such as a personal computer and a personal digital assistant (PDA).

Further, the present invention is applicable to a display control apparatus using a touch panel, such as a mobile telephone terminal or a mobile type image viewer, a display provided in a printer for selecting and confirming a print image, and a digital photo frame. In addition, since the object of the present invention is an improvement of application performance and reduction of power consumption, the present invention can be preferably applied to a mobile type display apparatus, such as a digital camera, a mobile telephone terminal, a mobile type image viewer, and a mobile type game machine.

As for the reason, in the mobile type display control apparatuses, since they are driven by a battery, usable power is limited compared with a non-portable type display control apparatus. Further, in the mobile type display control apparatus, most of processors and work memories are cheap and small in size compared with those of the non-portable type display control apparatus. Further, processing ability of them is generally low compared with that of the non-portable type apparatus.

As described above, the present invention has been described based on the preferable exemplary embodiment. However, the present invention is not limited to these specific exemplary embodiments, and can include various embodiments within the sprit and the scope of the present invention. Apart of above-described embodiments can be combined.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-185165 filed Aug. 7, 2009, which is hereby incorporated by reference herein in its entirety.

What is claimed is:

1. A display control apparatus comprising:
a display unit including a touch panel;
a touch condition detection unit configured to detect whether the touch panel is touched;
a touch position acquisition unit configured to acquire a touch position on the touch panel;

a distance determination unit configured to determine a distance, in a duration in which a touch is maintained, between an initial position and a final position which are acquired by the touch position acquisition unit;

a determination unit configured to determine what types of touch operation is performed based on a distance determined by the distance determination unit, the types of touch operation including at least a tap operation and a flick operation; and a control unit, configured to control, for the duration in which a touch is maintained, a sampling rate with which the touch position acquisition unit acquires the touch position, wherein, during a first period of time which is formed when the touch condition detection unit has started to detect a touch, sampling is started at a high sampling rate, and during a second period of time which is after the first period of time, the sampling is performed at a change sampling rate which is lower than the sampling rate of the first period of time, wherein the high sampling rate will be maintained when an acceleration of the change of the touch position exceeds a predetermined acceleration, and when the acceleration of the change of the touch position is equal to or smaller than the predetermined acceleration, the second sampling period will decrease to a slow rate, and wherein, in the touch operation performed during a period of time in which the sampling is performed at the high sampling rate, in a case where the distance is shorter than a predetermined value, the determination unit determines that the type of touch operation is the tap operation, and in a case where the distance is longer than the predetermined value and a movement of the touch position is in a predetermined speed or faster, the determination unit determines that the type of touch operation is the flick operation.

2. The display control apparatus according to claim 1 further comprising:

an acceleration determination unit configured to calculate an acceleration of touch position change based on a touch position acquired by the touch position acquisition detection unit and determine whether the calculated acceleration exceeds a predetermined acceleration;

wherein, after the control unit has performed the control to acquire a touch position in the first sampling rate, the control unit performs control to acquire a touch position in the first sampling rate by the touch position acquisition unit, when the acceleration determination unit determines that the acceleration exceeds the predetermined acceleration.

3. The display control apparatus according to claim 1 further comprising:

a display processing unit configured to perform display processing corresponding to a drag operation, based on the touch position acquired by the touch position acquisition unit, while the touch condition detection unit is continuously detecting the touch.

4. The display control apparatus according to claim 1, further comprising:

a speed determination unit configured to determine whether a speed of touch position change before an untouch is equal to or larger than a predetermined speed, when the distance determination unit determines that a distance is equal to or larger than a predetermined distance; and a display processing unit configured to perform display processing corresponding to a flick operation in a case when the determination unit determines that the flick operation is performed, wherein the determination unit determines that the flick operation is performed when the speed determination unit determines that the speed is equal to or larger than a predetermined speed.

5. The display control apparatus according to claim 1 further comprising:

a display processing unit configured to display processing corresponding to the tap operation, when the determination unit determines that the type of a touch operation is the tap operation;

a display processing unit configured to display processing corresponding to a double tap operation, when the determination unit determines that the type of a touch operation is a double tap operation, wherein the determination unit determines whether the type of a touch operation is a tap operation or a double tap operation, when the distance determination unit determines that a distance is less than a predetermined distance.

6. The display control apparatus according to claim 1, wherein when the control unit is in a predetermined mode, the control unit does not perform control for changing a touch position acquisition cycle by the touch position acquisition unit, and acquires a touch position at a constant cycle by the touch position acquisition unit.

7. The display control apparatus according to claim 6, wherein the constant cycle is longer than the first sampling rate.

8. The display control apparatus according to claim 7 further comprising:

a drag processing unit configured to perform control processing corresponding to a drag operation, based on a touch position acquired by the touch position acquisition unit, while the touch condition detection unit detects the touch, in the predetermined mode; and a tap processing unit configured to perform control processing corresponding to a tap operation when the touch condition detection unit detects untouch in the predetermined mode.

9. The display control apparatus according to claim 7 further comprising an imaging unit for shooting an image, wherein the predetermined mode is a shooting mode.

10. The display control apparatus according to claim 9, wherein, in the shooting mode, at least one of through-display processing for displaying an image captured by the imaging unit on the display unit on real time, face detection processing for detecting a human face from an image captured by the imaging unit, tracking processing for tracking a specified object in an image captured by the imaging unit, and shooting setting processing for performing shooting setting according to a specified object in an image captured by the imaging unit, is executed.

11. The display control apparatus according to claim 1, wherein the touch position acquisition unit acquires a touch position on the touch panel by averaging a plurality of touch inputs from the touch panel.

12. The display control apparatus according to claim 1, wherein the touch position acquisition unit performs coordinate conversion processing.

13. The display control apparatus according to claim 1, wherein the touch position acquisition unit performs correction calculation processing using a correction coefficient.

14. The display control apparatus according to claim 1, wherein the display control apparatus is a mobile type display control apparatus driven by a battery.

15. The display control method by a display control apparatus including a display unit including a touch panel, a touch condition detection unit configured to detect whether the touch panel is touched, and a touch position acquisition unit configured to acquire a touch position on the touch panel, the method comprising:
- determining a distance, in a duration in which a touch is maintained, between an initial position and a final position which are acquired by the touch position acquisition unit;
- determining what types of touch operation is performed based on the distance determined, the types of touch operation including at least a tap operation and a flick operation; and
- controlling, for the duration in which a touch is maintained, a sampling rate with which the touch position acquisition unit acquires the touch position,
- wherein, during a first period of time which is from when the touch condition detection unit has started to detect a touch, sampling is started at a high sampling rate, and during a second period of time which is after the first period of time, the sampling is performed at a changed sampling rate which is lower than the sampling rate of the first period of time,
- wherein the high sampling rate will be maintained when an acceleration of the change of the touch position exceeds a predetermined acceleration, and when the acceleration of the change of the touch position is equal to or smaller than the predetermined acceleration, the second sampling period will decrease to a slow rate, and
- wherein, in the touch operation performed during a period of time in which the sampling is performed at the high sampling rate, in a case where the distance is shorter than a predetermined value, the determination unit determines that the type of touch operation is the tap operation, and
- in a case where the distance is longer than the predetermined value and a movement of the touch position is in a predetermined speed or faster, the determination unit determines that the type of touch operation is the flick operation.

16. A non-transitory computer-readable storage medium storing a program for causing a computer to control a display control apparatus including a display unit including a touch panel, a touch condition detection unit configured to detect whether the touch panel is touched, and a touch position acquisition unit configured to acquire a touch position on the touch panel, to perform a method, the method comprising:
- determining a distance, in a duration in which a touch is maintained, between an initial position and a final position which are acquired by the touch position acquisition unit;
- determining what types of touch operation is performed based on the distance determined, the types of touch operation including at least a tap operation and a flick operation; and
- controlling, for the duration in which a touch is maintained, a sampling rate with which the touch position acquisition unit acquires the touch position, wherein, during a first period of time which is from when the touch condition detection unit has started to detect a touch, sampling is started at a high sampling rate, and during a second period of time which is after the first period of time, the sampling is performed at a changed sampling rate which is lower than the sampling rate of the first period of time,
- wherein the high sampling rate will be maintained when an acceleration of the change of the touch position exceeds a predetermined acceleration, and when the acceleration of the change of the touch position is equal to or smaller than the predetermined acceleration, the second sampling period will decrease to a slow rate, and
- in a case where the distance is longer than the predetermined value and a movement of the touch position is in a predetermined speed or faster, the determination unit determines that the type of touch operation is the flick operation.

* * * * *